(12) United States Patent
Reisman et al.

(10) Patent No.: US 6,466,871 B1
(45) Date of Patent: Oct. 15, 2002

(54) METHOD FOR CALIBRATING AND VERIFYING THE ATTITUDE OF A COMPASS

(75) Inventors: Shlomo Reisman, Ramat Hashavim; Boris Bronsteyn, Netanya, both of (IL)

(73) Assignee: Azimuth Technologies, Ra'anana Industrial Zone (IL)

( * ) Notice: Subject to any disclaimer, the term of this patent is extended or adjusted under 35 U.S.C. 154(b) by 0 days.

(21) Appl. No.: 09/678,398

(22) Filed: Oct. 3, 2000

(30) Foreign Application Priority Data

Oct. 3, 1999 (IL) ................................................ 132191

(51) Int. Cl.$^7$ .......................... G01C 21/00; G01S 1/02; G06F 9/00; G06F 17/00; G06F 19/00; G06F 165/00
(52) U.S. Cl. ........................ 701/224; 33/361; 33/370; 33/333; 33/357; 33/356; 33/362; 33/372; 342/52; 89/203; 89/205
(58) Field of Search ............................ 701/224, 200, 701/207, 213, 215, 220, 221, 223; 33/361, 370, 333, 356, 357, 362, 340, 365; 342/52; 89/203, 205

(56) References Cited

U.S. PATENT DOCUMENTS

| | | | | |
|---|---|---|---|---|
| 4,198,759 A | * | 4/1980 | Wirtanen et al. | 33/281 |
| 4,327,498 A | * | 5/1982 | Setter et al. | 33/333 |
| 4,686,772 A | * | 8/1987 | Sobel | 17/28 |
| 5,095,631 A | * | 3/1992 | Gavril et al. | 33/361 |
| 5,568,152 A | * | 10/1996 | Janky et al. | 342/357 |
| 5,949,529 A | * | 9/1999 | Dunne et al. | 356/4.01 |
| 6,282,362 B1 | * | 8/2001 | Murphy et al. | 386/46 |

* cited by examiner

Primary Examiner—William A. Cuchlinski, Jr.
Assistant Examiner—Ronnie Mancho
(74) Attorney, Agent, or Firm—Eitan, Pearl, Latzer & Cohen-Zedek

(57) ABSTRACT

A method for calibrating the attitude of a compass in relation to the platform on which the compass is installed. The compass includes an attitude determining device and an optical sighting device and the compass is integrally mounted on a platform. The method includes the steps of determining the angle between the optical sighting device and the attitude determining device, determining the attitude between the optical sighting device and the platform, and determining the attitude between the attitude determining device and the platform.

8 Claims, 8 Drawing Sheets

US 6,466,871 B1

METHOD FOR CALIBRATING AND VERIFYING THE ATTITUDE OF A COMPASS

FIELD OF THE INVENTION

This present invention relates generally to systems for calibrating and verifying the attitude and azimuth of a compass in relation to the platform on which the compass is installed which is particularly applicable to an Armored Fighting Vehicle (AFM).

BACKGROUND OF THE INVENTION

Compass systems including electronic magnetic compass systems are well known and are an essential component of Armored Fighting Vehicles (AFV) and the like. The purpose of the compass is to determine the, attitude and azimuth of the vehicle to which the compass is attached. An example of such an electronic magnetic compass system is described in U.S. Pat. No. 4,687,772 to Sobel.

Prior art systems utilize various devices including magnetometers and geomagnetic sensors to measure the travelling direction of a vehicle. Sobel, for example, describes an electronic magnetic compass system which includes a nonpendulous triaxial magnetometer, sensors for determining the pitch and roll of the vehicle body and an angle measuring device to determine the angle rotation between the hull and the turret of the tank.

A disadvantage of such systems is that they tend to be expensive to install, sensitive and are restricted to determining the attitude of the compass with respect to the vehicle. The compass readings do not accurately reflect an elevating object, such as the tank cannon.

Commonly today, antennas are used to collect data from GPS satellites encircling the globe to determine the azimuth and elevation of a vehicle. However, the problem of phase differences may lead to an incorrect calculation of the azimuth and elevation.

SUMMARY OF THE INVENTION

The present invention provides a method for calibrating the attitude of a compass in relation to the platform on which the compass is installed.

The present invention also provides a method for verifying the attitude and azimuth of a compass in relation to the platform on which the compass is installed.

In addition, a method is also provided for determining the azimuth of a target from a platform remotely located from said target.

There is thus provided, in accordance with a preferred embodiment of the present invention, a method for calibrating the attitude of a compass in relation to the platform on which the compass is installed. The compass includes an attitude determining device and an optical sighting device and the compass is integrally mounted on a platform. The method includes the steps of:

determining the angle between the optical sighting device and the attitude determining device;

determining the attitude between the optical sighting device, and the platform; and determining the attitude between the attitude determining device and the platform.

Furthermore, in accordance with a preferred embodiment of the present invention, the compass further includes a tilt sensor and the method further includes the step of determining the elevation of the compass utilizing the tilt sensor.

In addition, in accordance with a preferred embodiment of the present invention, the platform includes a supporting body, a rotating component coupled to the supporting body, the rotating component having a direct view optical device attached thereto, and a measuring device for determining the relative angle between the supporting body and the rotating component.

Furthermore, in accordance with a preferred embodiment of the present invention, the supporting body is independently movable in relation to the rotating component. The compass is attached to the rotating component.

Furthermore, in accordance with a preferred embodiment of the present invention, the step of determining the attitude between the attitude determining device and the platform includes the steps of:

a) sighting a first remote object using the optical sighting device;

b) recording a first angle ($\alpha_1$) between the rotating component and the supporting body and recording a first pitch ($p_1$) and a first roll ($r_1$) of the compass;

c) rotating the rotating component to sight the remote object via the direct view optical device;

d) recording a second angle ($\alpha_2$) between the rotating component and the supporting body and recording a second pitch ($p_2$) and a second roll ($r_2$) of the compass;

e) rotating the rotating component by an angle ($\beta$);

f) recording the angle $\alpha_k$ between the rotating component and the supporting body and the pitch ($p_k$) and the roll ($r_k$ of the compass;

g) repeating steps e) and f) a plurality of N times, h) calculating the pitch and roll of the compass with respect to the rotating component;

i) calculating the yaw of the compass with respect to the rotating component.

Furthermore, in accordance with a preferred embodiment of the present invention, $N \geq 5$. The angle ($\beta$) is approximately equal to $360°/N$ In addition, there is provided, in accordance with a preferred embodiment of the present invention a method for verifying the attitude of a compass. The compass includes an attitude determining device, a tilt sensor and an inertial sensor. The method includes the steps of:

determining the attitude of the compass with reference to the earth's axis from the attitude determining device; and determining the tilt of the compass from the tilt sensor;

determining the angular velocity of the compass from the inertial sensor;

determining a predicted azimuth value from the angular velocity and the compass attitude; and comparing the azimuth of the compass, obtained from the step of determining the attitude of the compass with reference to the earth's axis, with the predicted azimuth value, and comparing the elevation of the compass, obtained from the step of determining the attitude of the compass with reference to the earth's axis with the elevation obtained from the step of determining the tilt, thereby verifying the attitude of the compass.

In addition, there is provided, in accordance with a preferred embodiment of the present invention, a method for verifying the azimuth of a compass. The compass includes an attitude determining device and an inertial sensor. The method includes the steps of:

determining the attitude of the compass with reference to the earth's axis from the attitude determining device; and determining the angular velocity of the compass from the inertial sensor;

determining a predicted azimuth value from the angular velocity and the compass attitude; and comparing the azimuth of the compass, obtained from the step of determining the attitude of the compass with reference to the earth's axis, with the predicted azimuth value.

Furthermore, in accordance with a preferred embodiment of the present invention, the compass further includes a tilt sensor and the method further includes the step of determining the elevation of the compass utilizing the tilt sensor.

Additionally, there is provided, in accordance with a preferred embodiment of the present invention, a method for verifying the azimuth of a compass. The compass includes an attitude determining device and an tilt sensor. The method includes the steps of:

determining the attitude of the compass with reference to the earth's axis from the attitude determining device; and determining the elevation of the compass from the inertial sensor;

determining a predicted azimuth value from the elevation and the compass attitude; and comparing the azimuth of the compass, obtained from the step of determining the attitude of the compass with reference to the earth's axis, with the predicted azimuth value.

In addition, there is provided, in accordance with a preferred embodiment of the present invention, a method for determining the azimuth of a target from a platform remotely located from the target. The platform includes a base, a rotating component connected to the base, an elevating component connected to the rotating component, an attitude determining device attached to the rotating component and a rangefinder connected to the elevating component.

The method includes the steps of:

a) determining the attitude of the platform from the attitude determining device;

b) determining the distance from the platform to the target using the rangefinder;

c) assuming a first iteration value of elevation $\alpha 1$ of the elevating component;

d) determining an assumed position $N_a$, $E_a$) and height $h_a$ of the target from the attitude of the platform and the distance;

e) obtaining the height ($h_{dtm}$) for the target from Digital Terrain Map (DTM) data f) comparing the calculated height $h_a$ wit the height ($h_{dtm}$);

g) if height $h_a$ is not approximately equal (within predetermined parameters) to $h_{dtm}$;

i) select a second iteration value of elevation $\alpha 2$; and ii) repeat steps d)–f).

In addition, there is also provided, in accordance with a preferred embodiment of the present invention, a method for determining the azimuth of an elevating component connected to a rotation component, the rotating component connected to a platform. The method includes the steps of:

determining the azimuth of the rotating component;

calculate the elevation of the rotating component utilizing the tilt sensor; and calculating the elevation of the elevating component according to the method described hereinabove thereby to determine the azimuth.

Additionally, in accordance with a preferred embodiment of the present invention, the attitude determining device includes a plurality of antennas having a common longitudinal axis.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
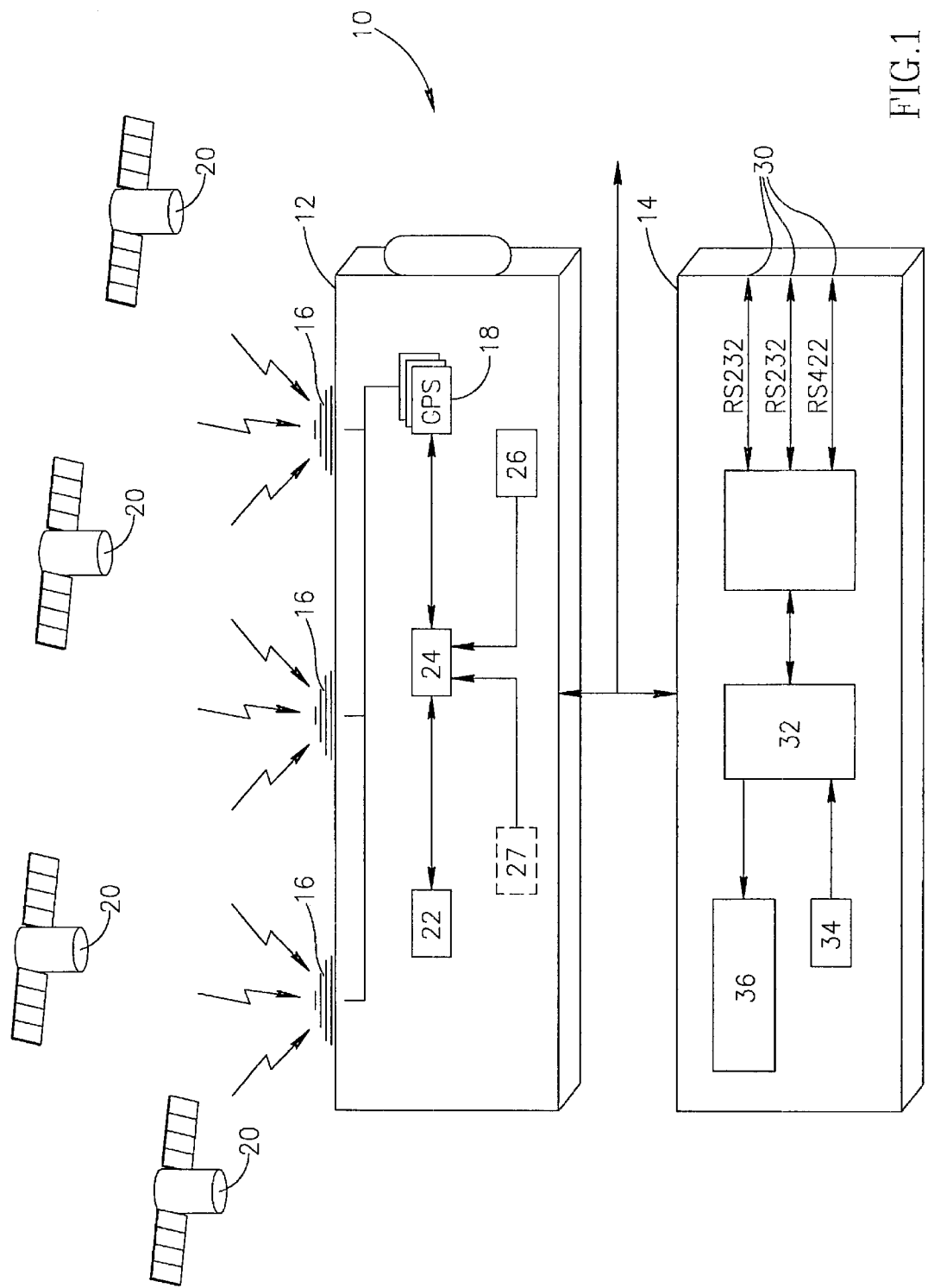
FIG. 1 is a schematic block diagram illustration of the main components of the compass unit and processing unit associated therewith, constructed and operative in accordance with a preferred embodiment of the present invention.

Reference is made to FIG. 1, which is a schematic block diagram illustration of the main components of the calibration and verification system, generally designated 10, constructed and operative in accordance with a preferred embodiment of the present invention. Calibration and verification system 10 comprises a compass unit 12 coupled to a control and processing unit 14. The compass unit 12 is installable on a platform, such as a vehicle, for example, an Armored Fighting Vehicle (AFV) or Armored Combat Vehicle (ACV).

In a preferred embodiment, the compass unit 12 comprises a plurality of antennas 16 which are coupled to a GPS receiver 18 for receiving data from the array of satellites 20 circling the globe.

Figure 2:
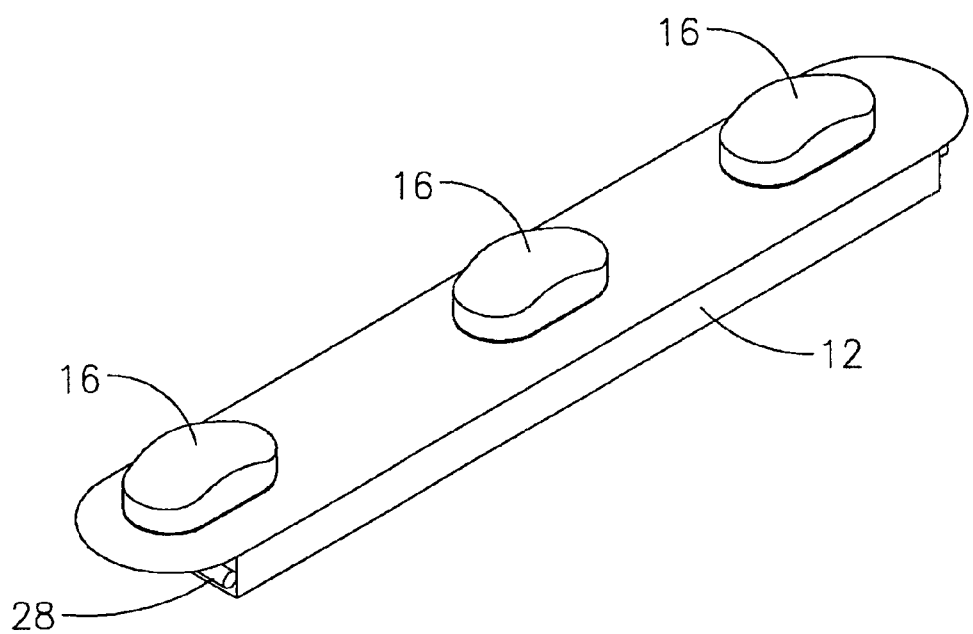
FIG. 2 is a schematic illustration of the compass of the system of FIG. 1.

Compass unit 12 further comprises a processor 22, a communications unit 24 and a tilt sensor 26. As seen in FIG. 2, compass unit 12 further comprises an optical eyepiece 28 attached to one side of the compass unit 12. Alternatively, the compass unit 12 further comprises an inertial sensor 27.

The angle $\gamma$ between the axis of the eyepiece 28 and the antennas 16 can be accurately determined during the manufacture of the compass unit 12. The value of angle $\gamma$ is used to determine the attitude of the compass unit 12 in relation to the platform on which the compass is installed.

Before installation on its platform, each compass unit 12 is accurately calibrated. An exemplary method of calibrating the compass unit 12 includes collecting of GPS data over a period of several hours (preferably at least 6 hours) on a fixed base in laboratory conditions. The GPS data is processed in order to obtain a reading for the azimuth of the particular compass unit 12 being calibrated. The calculated azimuth reading for the compass unit 12 is then compared with the exact known azimuth of the fixed base in the laboratory in order to accurately determine the compensation adjustment required for each compass unit 12. A method for verifying the attitude and azimuth of the compass which overcomes the problem of phase differences (see FIG. 7) is described hereinbelow.

Control and processing unit 14 is any suitable processing unit known in the art and, for example, may comprise communication ports 30, such as RS 232 and RS 242 connected to a computer unit 32 having a keyboard 34 and display screen 36.

Figure 3A:
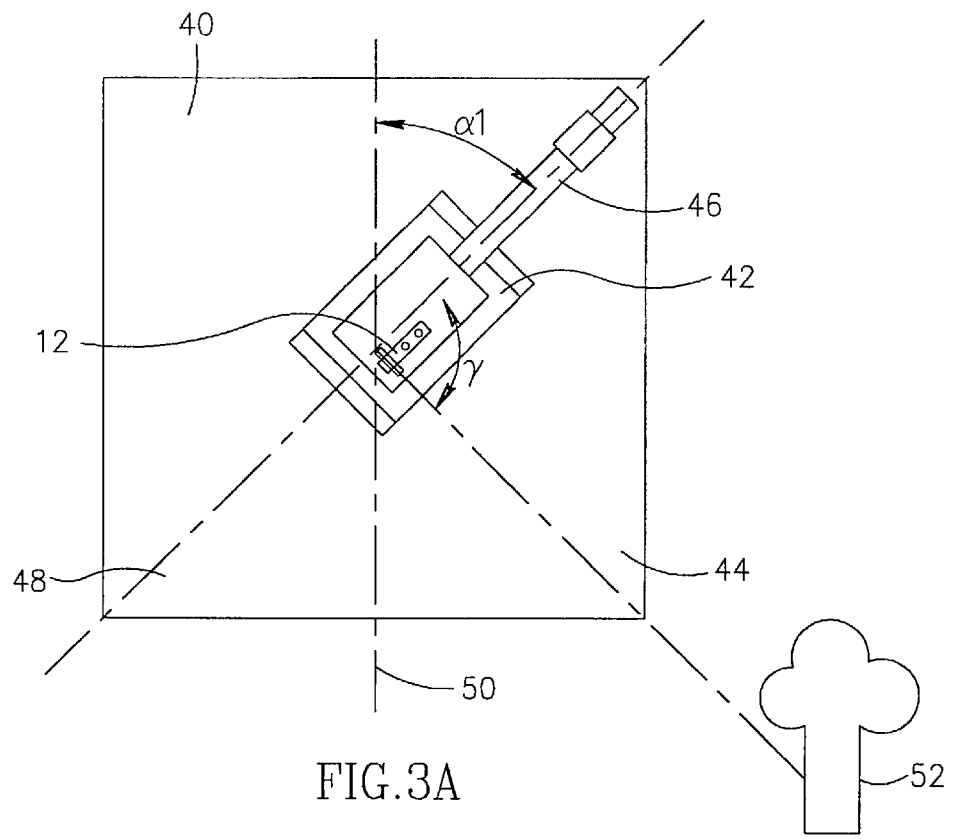
FIGS. 3A and 3B are schematic top elevational views of an AFV (tank) to which a sensing unit of FIG. 2 has been fixed.
Figure 3B:
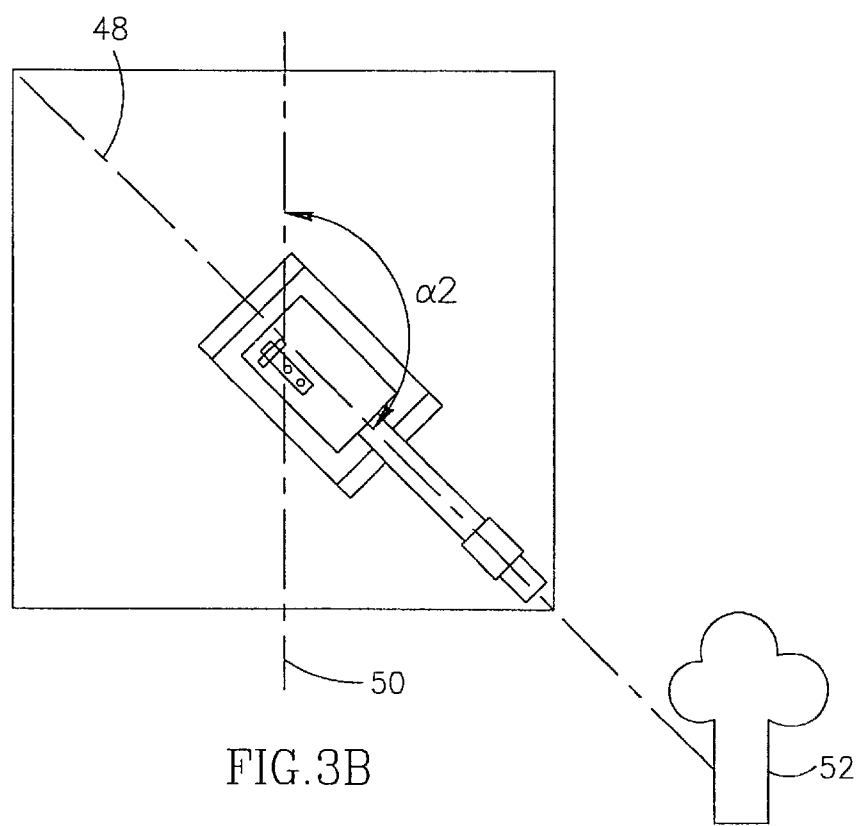
Figure 4:
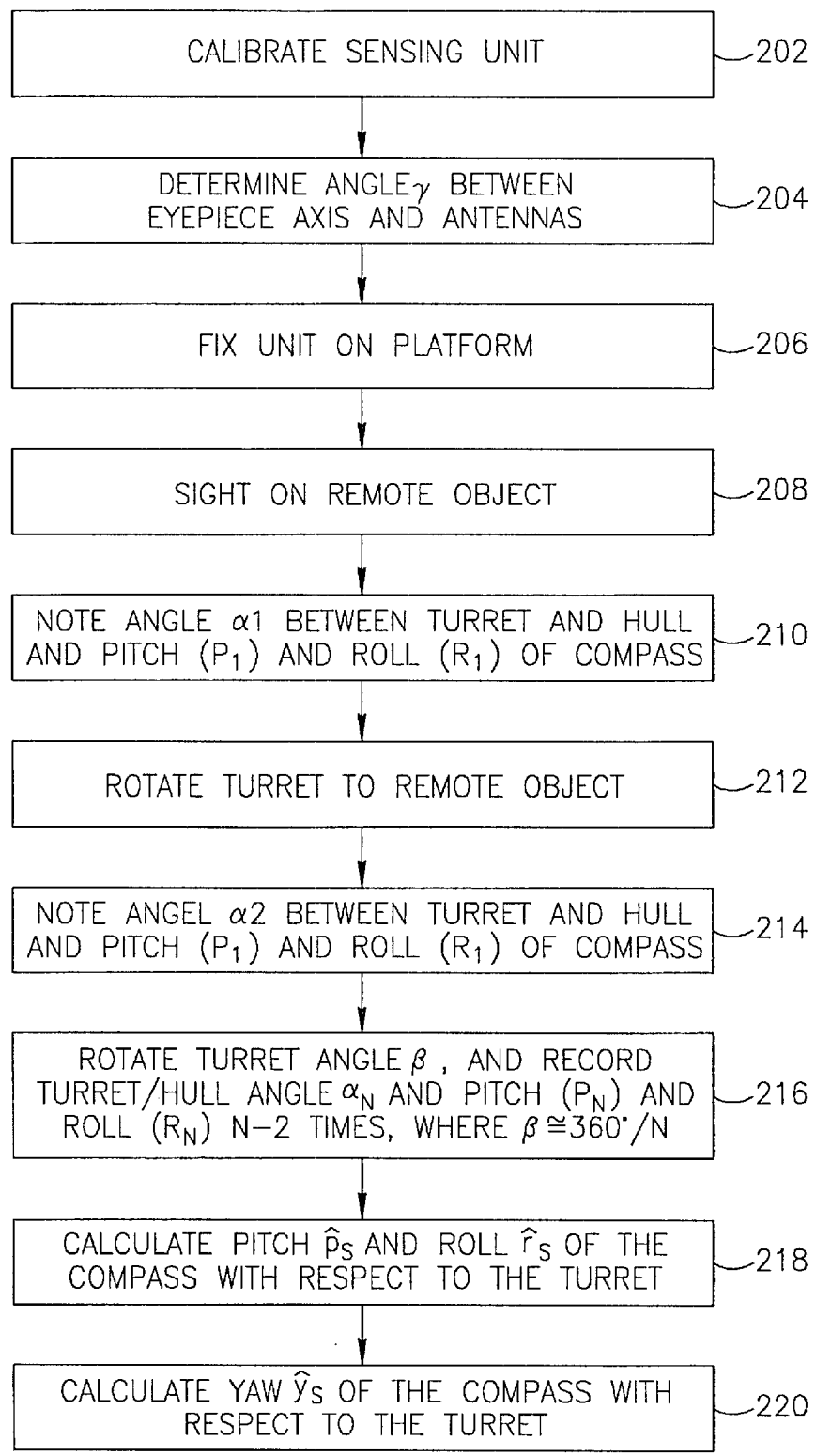
FIG. 4 is a flow chart illustration of the method of calibration of the azimuth and the AFV pitch and roll.

Reference is now made to FIGS. 3A and 3B, which are schematic top elevational views of an AFV, generally referenced 40, to which a compass unit 12 has been fixed. Reference is also made to FIG. 4, which is a flow chart illustration of the method of calibration of the attitude of the compass 12 in relation to the AFV platform 40. The method includes taking a set of N readings at different compass points. Preferably, N≧25 and the angle β between each reading (β is approximately equal to 360°/N). Thus, for example if N=6, readings are taken approximately every 60° (360/6).

For the purposes of example only and without limiting the present application, the following description refers to an AFV 40, as an exemplary platform.

Prior to installation on the platform, the compass unit 12 is accurately calibrated on a fixed base within the laboratory (step 202), as described above.

The angle γ between the axis of the eyepiece 28 and the antennas 16 is also determined at time of manufacture (step 204).

The compass unit 12 is fixed (step 206) preferably on the rotatable turret 42 of the AFV 40. AFV 40 also includes a hull 44 and a cannon 46. The compass unit 12 may be fixed at any suitable location on the turret 42 and is shown as being generally perpendicular to the longitudinal axis 48 of the turret 42 for clarity. The longitudinal axis of the AFV hull 44 is referenced 50.

A suitable remote object 52, such as tree, for example, is sighted using the optical eyepiece 28 (step 208). The distance to remote object 52 should be as large as possible. The angle $\alpha_1$ between the turret 42 and the hull 44, (angle between axis lines 48 and 50) and the pitch ($p_1$) and roll ($r_1$) of the compass 12 are recorded (step 210) (N=1).

The turret 42 is then rotated (step 212) until the object (tree 52) is in the sights of the direct view optical device which is generally affixed to the cannon (FIG. 3B). The turret/hull angle $\alpha_2$ between axis lines 48 and 50 and the pitch ($p_2$) and roll ($r_2$) of the compass 12 are recorded (step 214) (N=2).

A further N–2 readings of the turret/hull angle $\alpha_N$ and pitch ($p_N$) and roll ($r_N$) are taken, each time rotating the turret by an angle β, where β≈360°/N (step 216).

After N steps (say N=6) the following data is available:
h) a) a vector B of N turret/hull angles:
$B=(\alpha_1, \alpha_2, \alpha_3, \ldots, \alpha_N)^T$,
i) b) a vector P of N sensor pitch angles:
$P=(p_1, p_2, p_3, \ldots, p_N)^T$,
c) a vector R of N sensor roll angles:
$R=(r_1, r_2, r_3, \ldots, r_N)^T$.

The vectors B, P and R are then used to the calculate the pitch $\hat{p}_S$ and roll $\hat{r}_s$ of the compass With respect to the turret (step 218), and the yaw $\hat{y}_S$ of the compass with respect to the turret (step 220).

The angles P and R are measured using the East/North/Up coordinate system. The unknown values are the tank attitude angles $p_T$, $r_T$ and $y_T$. Calculation of the Compass Pitch and Roll The compass pitch may be estimated as the average value of the measured pitch on the full turret rotation (0–360 degrees). This is based on the fact that the average value will be zero if there is no compass pitch. Accordingly, the least square estimation is used for calculation of dependency of the measured pitch on the hull—turret angle:

$$p(\beta)=\overline{Q}[1\ \cos(\beta)\sin(\beta)]^T \quad (1)$$

The vector $\vec{Q}=(Q_{p0}\ Q_{p1}\ Q_{p2})^R$ is calculated according to the formula:

$$\vec{Q}=(\Phi^T\Phi)\Phi^T P. \quad (2)$$

The matrix Φ consists of N following rows: [1 cos($\beta_1$) sin($\beta_i$)].

The compass pitch $\hat{p}_S$ is defined from (1) as $\hat{p}_s=Q_0$.

The compass roll may be defined similar to the pitch (which is applicable in the case of attitudes where $p_T$, $r_T$ is less than 10°):

$$r(\beta)=\vec{U}[1\ \cos(\beta)\sin(\beta)]^T, \quad (3)$$

$$\overline{U}=(\Phi^T\Phi)\ \Phi^T R,\ \hat{r}_s=U_0. \quad (4)$$

Calculation of the Compass Yaw

The first two steps of the calibration procedure are used for calculation of the compass yaw in relation to the turret. For this purpose, two matrix equations are constructed in order to get the direction to the remote point The first step gives:

$$C(A_{rg})=C(A_T)C_r(\beta_1)C(A_S)C(\alpha). \quad (5)$$

The second step gives:

$$C(A_{rg})=C(A_T)C_r(\beta_2). \quad (6)$$

The formulas (5) and (6) use the following notation:
$A_T=(0\ p_T r_T)^T$ —attitude of the tank (the yaw is ignored);
$A_s=(y_S\ p_S\ r_S)^T$ —attitude of the compass in the turret coordinates;
C($\overline{a}$) is rotation matrix, corresponding to any attitude vector (for example. $A_T$ or $A_S$):

$$Cy(\alpha):=\begin{pmatrix} \cos(\alpha) & -\sin(\alpha) & 0 \\ \sin(\alpha) & \cos(\alpha) & 0 \\ 0 & 0 & 1 \end{pmatrix}$$

$$Cp(\alpha):=\begin{pmatrix} 1 & 0 & 0 \\ 0 & \cos(\alpha) & -\sin(\alpha) \\ 0 & \sin(\alpha) & \cos(\alpha) \end{pmatrix}$$

$$Cr(\alpha):=\begin{pmatrix} \cos(\alpha) & 0 & \sin(\alpha) \\ 0 & 1 & 0 \\ -\sin(\alpha) & 0 & \cos(\alpha) \end{pmatrix}$$

$C(a)=Cy(a_0)\cdot Cp(a_1)\cdot Cr(a_2)$

The left hand side of equations (5), (6) correspond to the same remote point. Its yaw may be found from matrix $C(A_{rg})$ as:

$$Y_{rg}=\arctg\left(-\frac{C_{0,1}}{C_{1,1}}\right).$$

Thus, yaw $y_S$ may be found as the angle that provides the following equivalence:

$$C(A_T)C_r(\beta_1)C(A_S)C(\alpha)=C(A_T)C_r(\beta_2). \quad (7)$$

($y_s$ is included in $A_s$)

The above calculations generate the azimuth (yaw), pitch and roll of the compass with respect to the turret. These values for the compass with respect to the turret do not necessarily relate to the cannon. This is especially so if the AFV is not "on the level" and subject to roll. That is, the azimuth of the cannon only equals the azimuth of the turret if the AFV is horizontal.

To accurately fix the target, it is essential that the pitch, roll and yaw ($p_c$, $r_c$, $y_c$) of the cannon are accurately known.

The correct pitch, roll and yaw of the cannon can be calculated by one of several methods known in the art. For example, by adding a transducer to the cannon, the angle of the cannon itself can be measured. Alternatively, by integrating the cannon and the turret with the fire control system of the AFV, the value of the pitch, roll and yaw of the cannon can be obtained. It is difficult and expensive to integrate the compass with the platform sensors. Furthermore, the transducer needs to be able to withstand the rugged conditions of the AFV and requires additional connections which further complicates the control system.

Applicant has realized that by using a rangefinder together with map data available from Digital Terrain Model (DTM) maps, it is possible to accurately determine the correct pitch, roll and yaw of the compass with respect to the cannon itself for any AFV without the necessity of fitting expensive and complicated transducers and or special integration of the fire control system.

Figure 5:
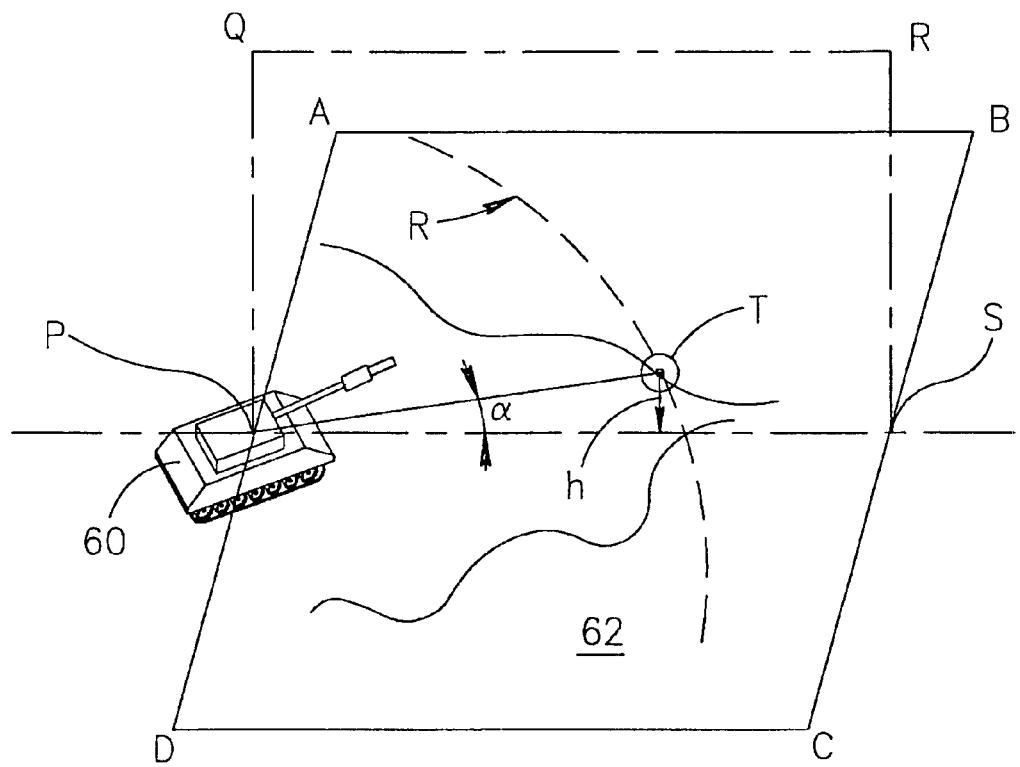
FIG. 5 is a schematic illustration of an AFV (tank) within a contoured terrain.
Figure 6:
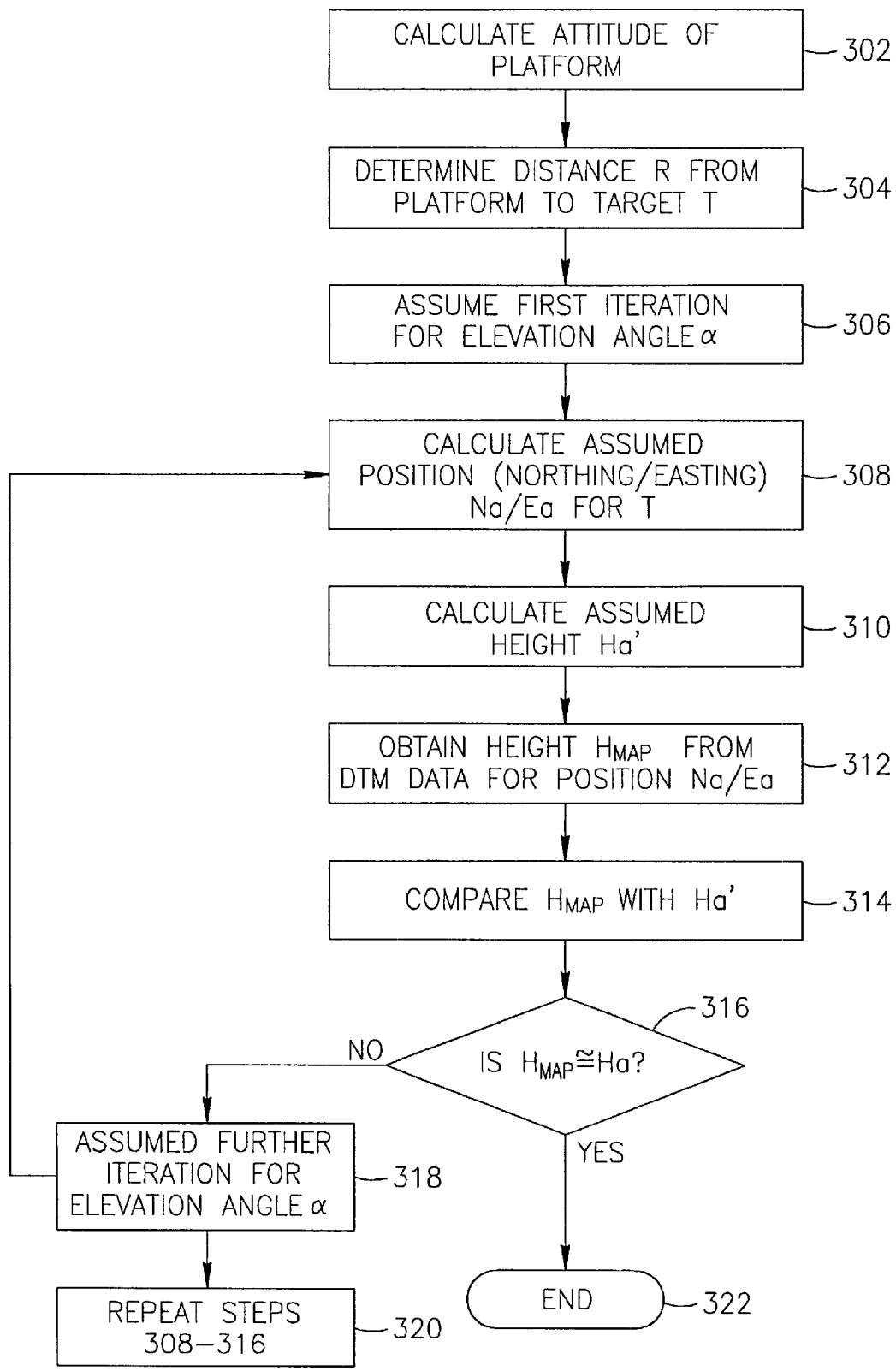
FIG. 6 is a flow chart diagram to illustrate the method of calculation using a rangefinder together with DTM data.

Reference is now made to FIGS. 5 and FIG. 6. FIG. 5 is a schematic illustration of an AFV (tank) within a contoured terrain, generally designated 62, and FIG. 6 is a flow chart diagram to illustrate the method of determining the azimuth of a target (using a rangefinder together with DTM data) from the AFV platform, the target being remotely located from the AFV platform. FIG. 5 schematically illustrates (box ABCD) the area over which the turret of AFV rotates. Box PQRS illustrates a sectional slice taken along line P-S. T is a target having a height h above the level of the turret (line P-S). Angle α is the angle of elevation of the cannon above line P-S. R is the arc distance from the cannon to the target T.

As the AFV 60 traverses the terrain 62, the roll and pitch of the AFV changes and consequently, the roll and pitch of the turret and cannon change.

At any position P, the attitude of the AFV can be calculated (as described hereinabove with respect to FIG. 4)—step 302. Using a rangefinder, the distance R to the target T is determined (step 304).

An assumed value of the position and height of the target T can be determined knowing the attitude of the AFV 60, the distance R to the target T and the angle of elevation α. The angle α is determined by iteration.

Thus, to determine the Northing and Easting positions and the height of target T, a first iteration is made (step 306), assuming an angle α', say 5°.

Knowing the distance R, the attitude of AFV 60 and the angular direction of the cannon, a first estimation (assumed) value of the northing/easting ($N_a$, $E_a$) (step 308) and an assumed height $h_a$ of target T can be calculated (step 310).

Using the DTM map, the height ($h_{map}$) for the assumed northing/easting ($N_a$, $E_a$) of T (from step 308) can be found (step 312). The values of $h_{map}$ and h' are compared (step 314) and if $h_{map}$ is not approximately equal (within predetermined parameters) to h' (query box 316), then a further iteration for the elevation angle α' (step 318) is made and steps 308–316 are repeated (step 320) until $h_{map}$ is approximately equal to h' (within predetermined parameters) (step 322). Thus, the angle of elevation of the cannon can be determined.

Figure 7:
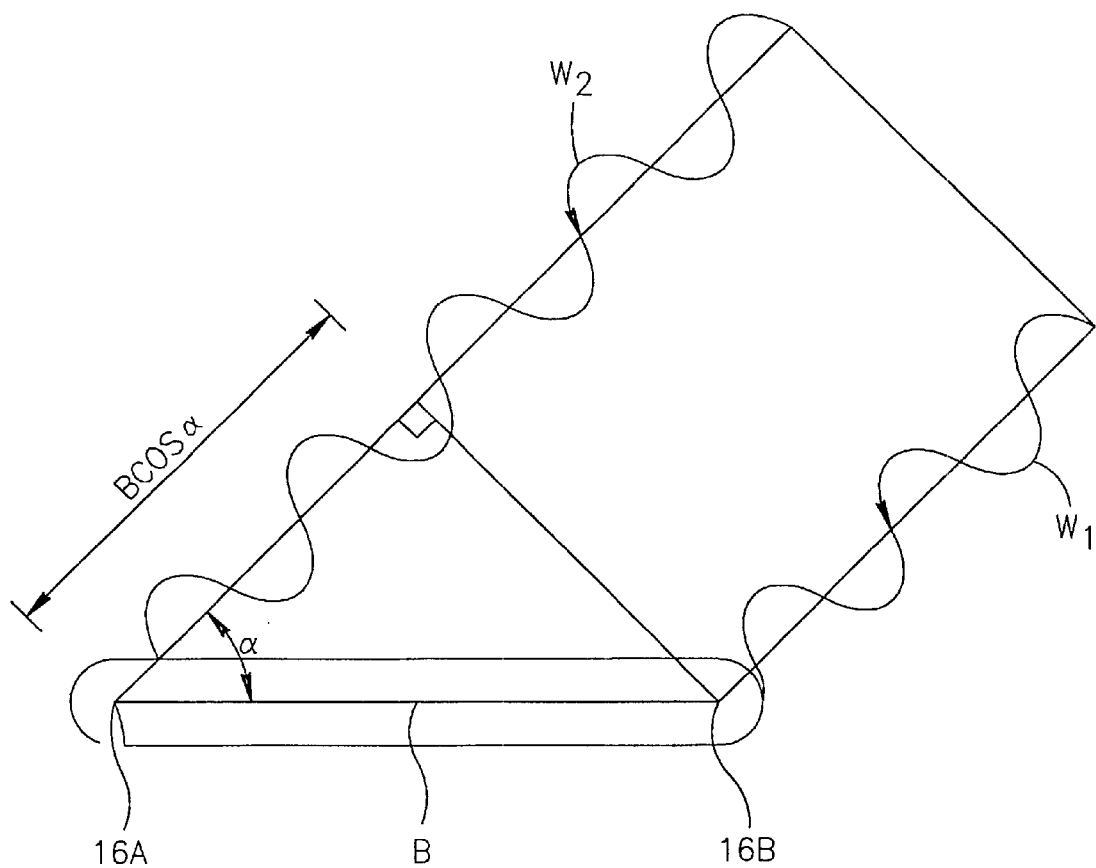
FIG. 7 is a schematic illustration of the relationship between the phases of the signals from the satellites received by two antennas.

Reference is now made to FIG. 7 which is a schematic illustration of the relationship between the phases of the signals from the satellites received by two antennas, referenced 16a and 16b, at either end of the calibration compass unit 12, a distance B apart. W1 and W2 illustrate the incoming wavelengths from one of the GPS satellites encircling the globe. In practice each of the antennas receives input from 8–10 satellites at a time. The quality of the signals from these satellites vary. The signal received by satellite 16a arrives a short time after the signal received by satellite 16b. The phase difference φ can be calculated from:

$$\varphi = \frac{b \cos \alpha}{\lambda}$$

Where λ is the wavelength of the signal.

For an exemplary calibration compass unit 12m, where B=60 cm and λ=19 cm and α=0, the phase difference φ=3.1. However phase differences φ are only referred to by the figure to the right of the decimal point (the integer being dropped) That is, in the example, the phase difference φ is recorded as 0.1. Since it is not known whether the phase difference φ is 3.1 or 2.1 or 1.1, for example, there are several possible answers for the angle α. Thus, phase difference φ=N+φ', where N is an integer having value: 3≧N≧−3, that is N has 7 possible values. Since there are three dimensions and assuming that 4 satellite signals are received, the number of possible solutions is approximately 1200 ($7^3$*4).

Using common sense and observation, it is possible by eliminating obviously impossible answers, to reduce the number of possible solutions to a more reasonable number of say about 10 'likely' solutions. Then using the known attitude, b can be calculated. However, attitude determination does not provide 100% accuracy since it is still possible to obtain several probable results.

The following table is an illustrative example of possible results obtained.

TABLE 1

|   | Azimuth | Elevation | Calc, b |
|---|---------|-----------|---------|
| a) | 90° | 1° | 61.0 |
| b) | 95° | 10° | 60.5 |

In this case, either a) or b) may be correct, and the most likely solution is b) since the calculated value of b (60.5) is closer to the known value of 60 cm.

A method for verifying the attitude and azimuth of the compass which reduces the degree of ambiguity and allows for a higher degree of accuracy to be obtained in overcoming the problem of phase differences is now described.

Referring again to FIG. 1, the compass unit 12 comprises a plurality of antennas 16 which receive GPS data from the array of satellites 20 circling the globe a tilt sensor 26 and alternatively an additional sensor such as an inertial sensor 27.

By utilizing the tilt sensor 26 and the inertial sensor 27, the attitude and azimuth of the compass unit 12 can be independently verified.

The data received by the plurality of antennas 16 (from the GPS) allows the attitude (azimuth and elevation) to be determined. The tilt sensor 26, using gravity, measures the elevation of the compass. The inertial sensor 27 allows the angular velocity a of the compass to be determined.

Figure 8:
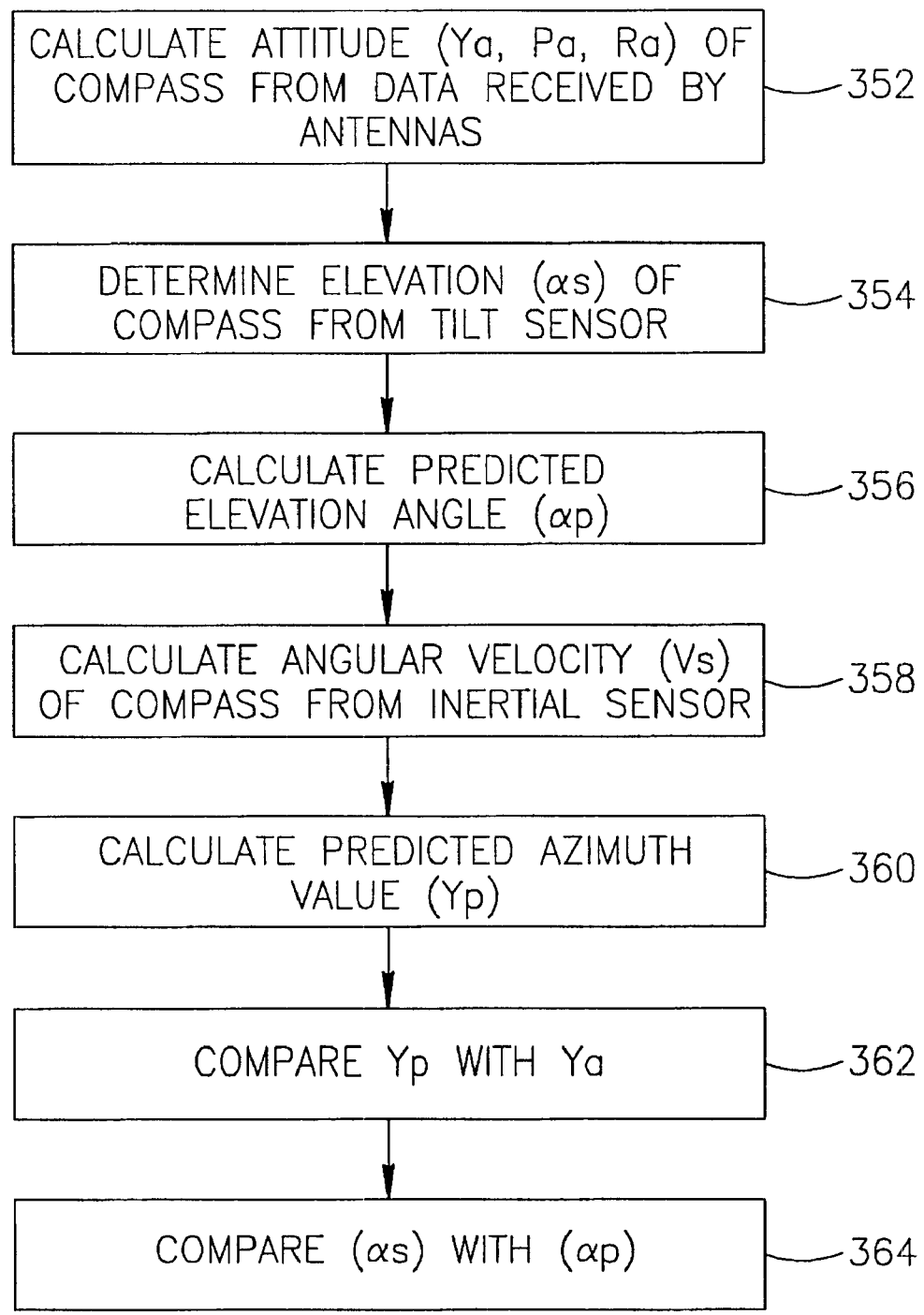
FIG. 8 is a flow chart diagram to illustrate the method of verifying the attitude of the compass of the system of FIG. 1.

Thus, to verify the azimuth of the compass, a comparison is made between the predicted azimuth value obtained from the inertial sensor with the azimuth value obtained from the GPS satellites. In addition, to verify the attitude of the compass, a comparison is also made between the elevation of said compass, obtained from the GPS satellites with the elevation obtained from the tilt sensor 26. The method is described with respect to FIG. 8.

The attitude (Ya, Pa, Ra) of the compass with reference to the earth's axis is determined from the data received from the antennas (step 352). The tilt of the compass is determined from the tilt sensor (step 354).

The predicted elevation angle (αp) is then calculated from the compass attitude (step 356)

The velocity of the compass is determined from the inertial sensor (step 358). The predicted azimuth value is then calculated from the velocity (Vs) and the compass attitude (step 360).

The angle value $\alpha_0$, say, determined from the GPS is adjusted by $\omega$., as follows (t=time), to give a predicted value $\alpha_p$, as follows:

$$\alpha_p = \alpha_0 + \omega t$$

The values of $\alpha_0 + \omega$ are then filtered through a Kalman filter to give a further estimate ($\alpha_p'$). The values of $\alpha_p'$ and $\Delta_p$ should be approximately the same. Thus, in the example of the above Table, if $\alpha_0=90°$, for a value of $\omega=0$, $\alpha_p=90°$. Thus, from the two possible values (a or b) shown in Table 1 (above), a is the more probable correct answer.

Finally, to verify the azimuth of the compass, the values obtained from the step of determining the attitude of the compass with reference to the earth's axis (step 352) is compared (step 362) with the predicted azimuth value (step 360). To verify the attitude, the elevation of the compass obtained from the step of determining the attitude of said compass (step 356) is compared (step 364) with the elevation obtained from the tilt sensor (step 354).

Thus, the degree of ambiguity reduced and a higher degree of accuracy is obtained.

It will be appreciated that the present invention is not limited by what has been described hereinabove and that numerous modifications, all of which fall within the scope of the present invention, exist. Rather the scope of the invention is defined by the claims, which follow:

What is claimed is:

1. A method for verifying the attitude of a compass, the compass comprising an attitude determining device, a tilt sensor and an inertial sensor, the method comprising the steps of:

determining the attitude of said compass with reference to the earth's axis from said attitude determining device; and determining the tilt of said compass from said tilt sensor;

determining the angular velocity of said compass from said inertial sensor;

determining a predicted azimuth value from said angular velocity and said compass attitude; and comparing the azimuth of said compass, obtained from said step of determining the attitude of said compass with reference to the earth's axis, with the predicted azimuth value, and comparing the elevation of said compass, obtained from said step of determining the attitude of said compass with reference to the earth's axis with the elevation obtained from said step of determining the tilt, thereby verifying the attitude of said compass.

2. The method according to claim 1, wherein said attitude determining device comprises a plurality of antennas having a common longitudinal axis.

3. A method for verifying the azimuth of a compass, the compass comprising an attitude determining device and an inertial sensor, the method comprising the steps of:

determining the attitude of said compass with reference to the earth's axis from said attitude determining device; and determining the angular velocity of said compass from said inertial sensor;

determining a predicted azimuth value from said angular velocity and said compass attitude; and comparing the azimuth of said compass obtained from said step of determining the attitude of said compass with reference to the earth's axis, with the predicted azimuth value.

4. A method according to claim 3, wherein said compass further comprises a tilt sensor and wherein the method further comprises the step of:

determining the elevation of said compass utilizing said tilt sensor.

5. The method according to claim 3, wherein said attitude determining device comprises a plurality of antennas having a common longitudinal axis.

6. A method for determining the azimuth of a target from a platform remotely located from said target, said platform comprising a base, a rotating component connected to the base, an elevating component connected to the rotating component, an attitude determining device attached to the rotating component and a rangefinder connected to the elevating component, the method comprising the steps of:

a) determining the attitude of said platform from the attitude determining device;

b) determining the distance from the distance from the platform to the target using said rangefinder;

c) assuming a first iteration value of elevation $\alpha 1$ of the elevating component;

d) determining an assumed position ($N_a$, $E_a$) and height $h_a$ of the target from the attitude of said platform and said distance;

e) obtaining the height ($h_{dtm}$) for said target from Digital Terrain Map (DTM) data;

f) comparing the calculated height $h_a$ with the height ($h_{dtm}$);

g) if height $h_a$ is not approximately equal (within predetermined parameters) to $h_{dtm}$;
      i) select a second iteration value of elevation $\alpha 2$; and
      ii) repeat steps d)–f).

7. The method according to claim 6, wherein said attitude determining device comprises a plurality of antennas having a common longitudinal axis.

8. A method for determining the azimuth of an elevating component connected to a rotating component, said rotating component connected to a platform, the method comprising the steps of:

determining the azimuth of the rotating component;

calculate the elevation of said rotating component utilizing the tilt sensor; and calculating the elevation of the elevating component according to the method of claim 6;

thereby to determine the azimuth.

* * * * *